April 22, 1958  J. P. COLLOPY  2,831,804
PROCESS FOR THE IMPROVEMENT AND RECLAMATION OF SOILS
Filed Jan. 30, 1956  4 Sheets-Sheet 1
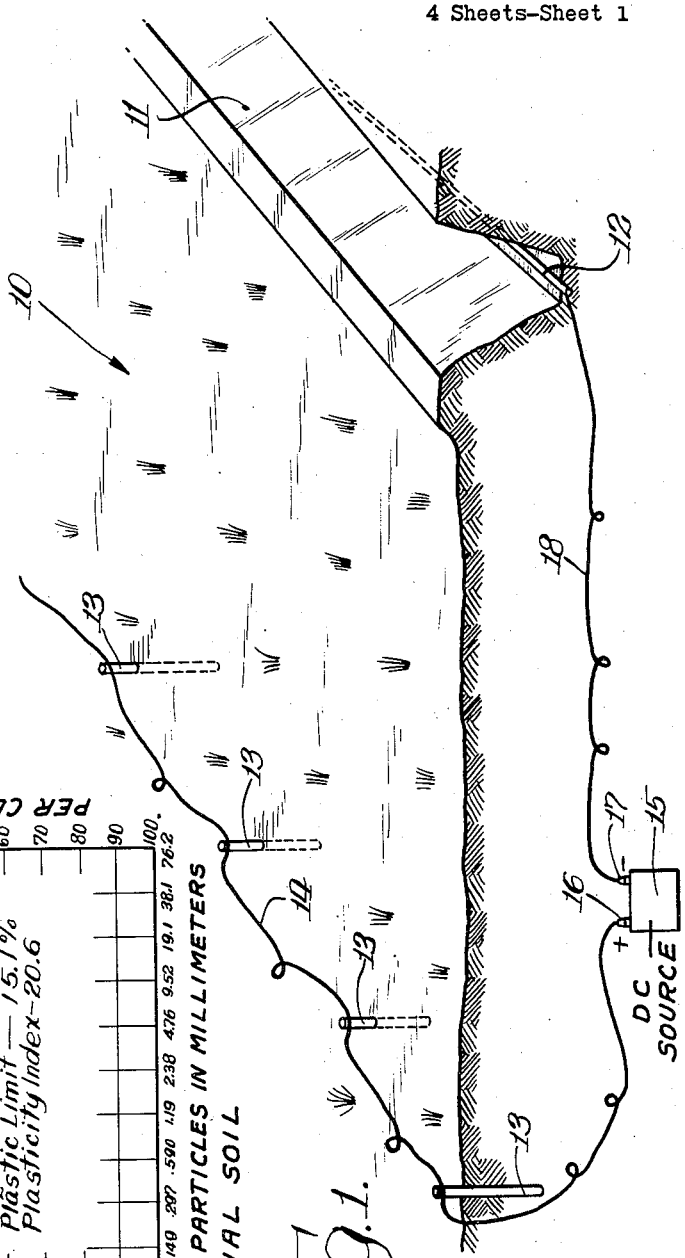
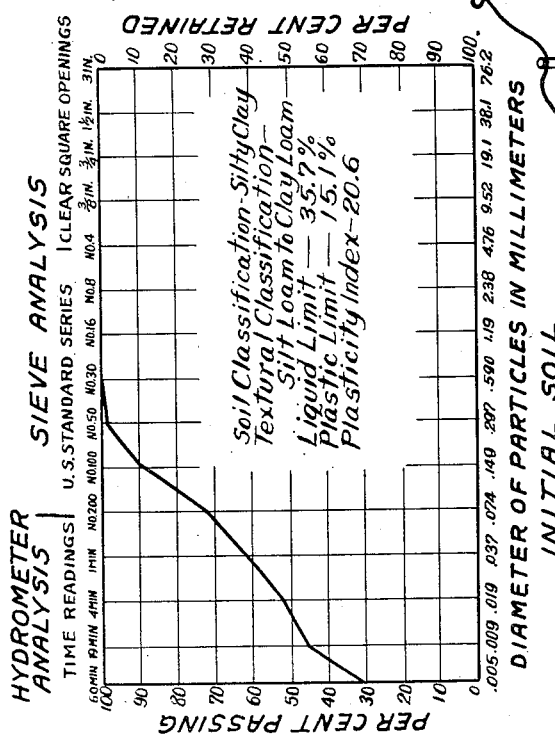
INVENTOR.
Joseph P. Collopy,
BY
Attys.

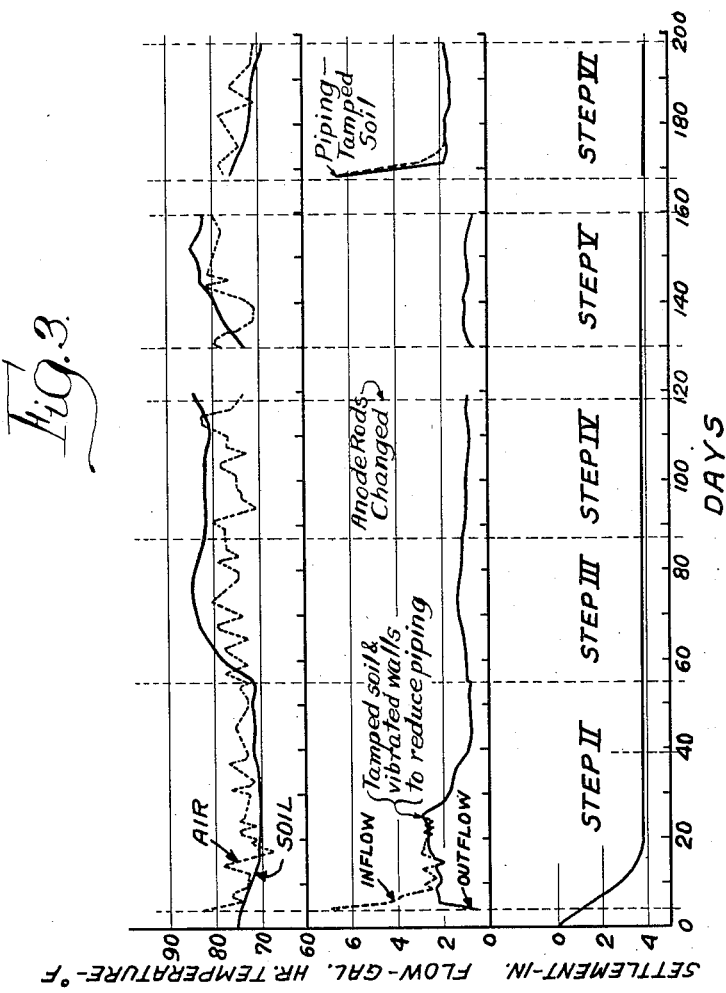

CHEMICAL ANALYSIS OF THE EFFLUENT WATER

United States Patent Office 2,831,804
Patented Apr. 22, 1958

2,831,804
PROCESS FOR THE IMPROVEMENT AND RECLAMATION OF SOILS

Joseph P. Collopy, Powell, Wyo., assignor to Collopy Electro-Soil Company, Phoenix, Ariz., a corporation of Delaware Application January 30, 1956, Serial No. 562,311

4 Claims. (Cl. 204—131)

This invention relates generally to treatment of soils and particularly to the improvements in reclamation of soils for agricultural purposes.

It is general knowledge that, especially in the arid portions of the earth's surface, certain soils contain excessive amounts of saline or alkali salts which retard or substantially prevent plant growth. The exact mechanism by which these salts retard plant production is somewhat obscure, but it is known that the presence of the harmful salts, such as salts of sodium, in excessive amounts in soil relate to the retarded growth factors. The reclamation of such soils has been a constant goal of soil scientists and agricultural engineers in both this country and abroad for many years. To date, no universally satisfactory method is known to be available for economically reclaiming alkali soils.

The most common practice for the reclamation of such alkali soils in the United States consists of a leaching process wherein the area to be treated is flooded or ponded so that the water may soak into the soil, carrying with it harmful salts to a depth below the root zone of the crop to be grown. One of the more serious shortcomings of this conventional method of leaching soils lies in the fact that the alkali soils are usually characterized by poor permeability whereby the penetration of the leaching water is slow and inefficient. As a result, harmful salts, especially sodium salts, which are leached downwardly by the penetration of the water, tend to deposit near the surface of the area to build up a very tight layer or "hardpan" which further restricts proper drainage and cuts down the water penetration. One common method of combatting the "hardpan" is to employ a "ripper" machine or plow having blades which are pulled through the tight soil to break up the tightly packed earth. This method is expensive and generally ineffective since subsequent irrigation of the area causes a swelling of the tightly packed particles to reform the damaging hardpan layer.

The formation of such hardpan layer may be effectively combatted by breaking through the same to the sand or gravel so that the latter may mix with the less permeable soil, thereby permitting the applied water to leak through the soil more rapidly. This solution is generally not effective where the depth to the more permeable sand and gravel is too great to be reached economically by known methods of plowing or ripping or where the area is bogged or swampy due to a high water table. In some instances, certain chemicals may be added to the soil in an attempt to counteract the harmful effects of sodium, but the effectiveness of their use is limited and costly.

My present invention seeks to overcome the above-mentioned difficulties and to present a more efficient and effective solution for the reclamation of alkali soils both by providing an improved means for removing the harmful sodium and by increasing the permeability of the soil treated. The improved method of sodium removal brought about by my present process also releases certain plant nutrients theretofore unavailable for plant growth, thus causing increased crop yield and earlier maturation.

Generally speaking, the process of the present invention, which is hereinafter termed "electro-reclamation," combines certain known phenomena, which occur at the application of electrical current to soil according to the principles of electro-osmosis, electro-phoresis and electro-chemical reactions, with beneficial principles of the more familiar leaching or flooding methods hereinabove outlined. The combined effect provides a very effective method of reclaiming and improving alkali soils.

Basically, the electro reclamation process of my invention seeks to produce increased removal of the harmful sodium by passing a direct electrical current through the area to be reclaimed, thereby to bring about an increased exchange of calcium and sodium and the depression of lowering of the water. Accompanying the improved removal of sodium is a percolation effect brought about by the release of hydrogen and other gases upwardly through the soil to improve the soil's permeability and friability. Such above mentioned factors apparently contribute a combined effect to render the treated soil suitable for growing normal crops, to increase plant growth and yield and to accelerate the normal rate of crop maturation.

The main object of this invention is to provide a new and improved process for treating and reclaiming alkali and saline soils.

Another object of this invention is to provide a new and improved process for increasing permeability and nutritional characteristics of soils treated by my process.

Still another object of my invention is to provide a new and improved process for the reclaiming of alkali soils whereby the soil is rendered more friable to aid in the preparation of the seed bed.

A still further object of this invention is to provide a new and improved method or process for treating soils whereby earlier maturation and an increase in plant growth and vegetation is brought about.

An additional object of this invention is to provide a method of treating soil whereunder plant nutrients present in the soil, but unavailable for plant growth, are released to produce increased crop yield.

A still further object of this invention is to provide a new and improved method of treating soils whereby the removal of harmful salts and the release of desirable plant nutrients render the soil treated more suitable and valuable for agricultural and other purposes.

The above and further objects, features and advantages of this invention will become apparent to those familiar in the art from the following detailed description and specifications of my improved process and the findings thereunder. The concepts and principles of my process will be made clear and understandable from the illustrations and chartered information set forth in the accompanying drawings.

In the drawings:

Figure 1 is a schematic representation in perspective of a typical field installation embodying apparatus for carrying out the improved process for this invention;

Figure 2 is a chart illustration setting forth the characteristics of a typical soil employed in a laboratory examination and research of the improved process of this invention;

Figure 3 is an additional chart showing various data encountered during the laboratory treatment of soil under my improved process;

Figure 4:
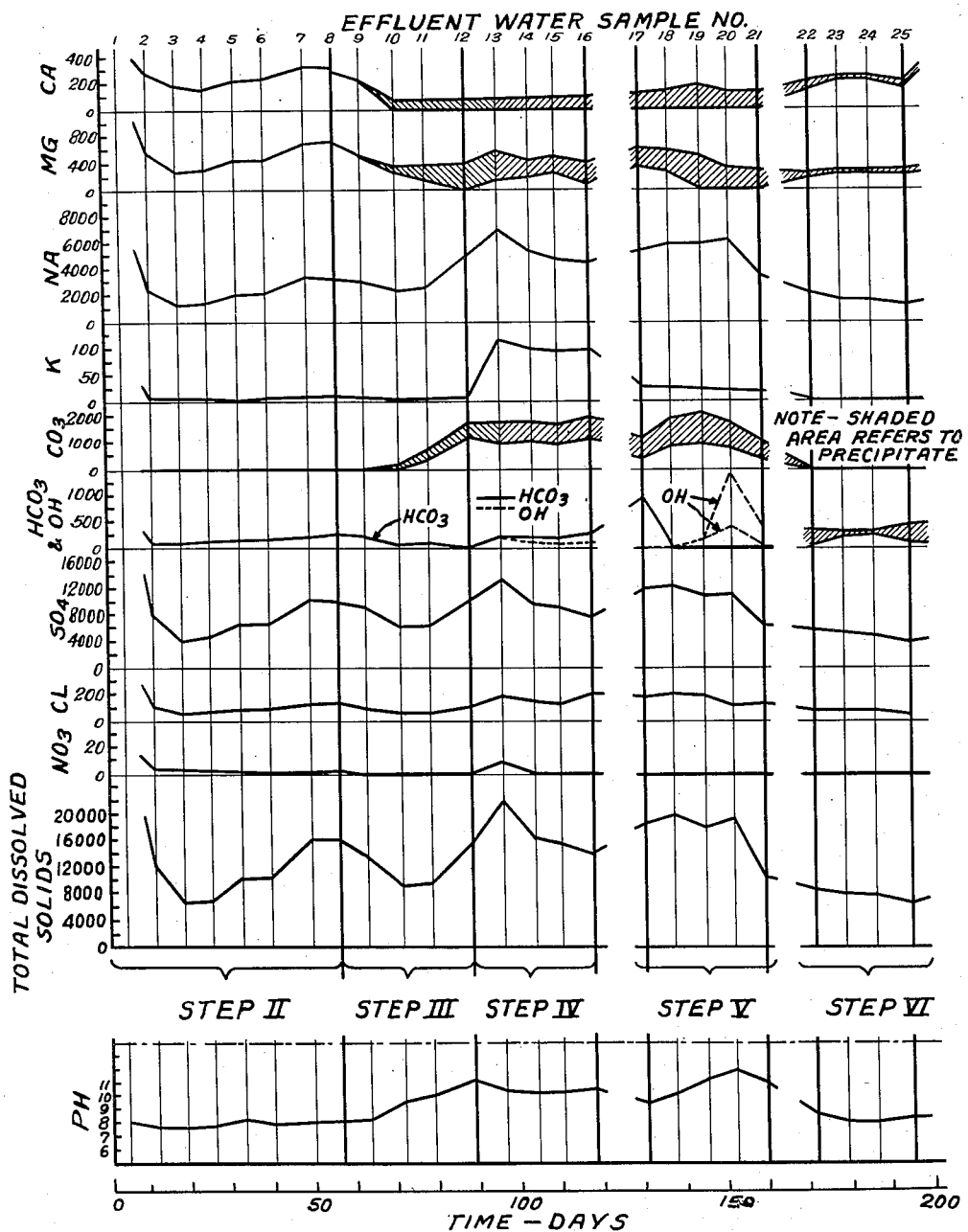
Figure 4 is another chart illustrating the chemical analysis of effluent water produced during the laboratory research of my process.

In setting about to treat an alkali soil for the purpose of reclaiming the same to agricultural use, the most practical method known until the present has been the "leaching" process, as mentioned hereinabove, whereby the field or acreage is flooded with irrigation water which drains through the soil to remove the harmful sodium. In most instances of soil having a high alkaline or saline content, a relatively high water table is encountered. When the water table is close enough to the surface to enter the root zone of the plant or vegetation, growth is seriously retarded. Normally when this condition is encountered, previously known methods have sought to lower the water table by providing suitably located drains or wells. If the permeability of the soil is insufficient, the drains or wells are effective for short distances only. The presence of a high water table also seriously impairs the efficiency of the normal leaching process and retards or limits the removal of sodium by that process. As a result, large areas of this and other countries have long been considered incapable of reclamation.

For some time, scientists have employed electro-osmotic phenomena, first established in 1807, to the problem of draining fine grain soils on a small scale. Briefly, such efforts embody the application of direct currents between anodes and cathodes established in fine grain soils to increase underground water seepage. Such electro-drainage effect found successful application by the Germans during and prior to World War II in reclaiming certain poorly drained areas for the construction of railways and submarine pens, for example.

According to the principles of the electrical drainage process developed by earlier scientists, if an electrode, such as a piece of gas pipe, is submerged in a filter well and another electrode is driven into the soil a short distance away, the application of direct current to and between the electrodes causes the creation of an electrical field in the soil. A portion of the electric current flows from the positive to the negative pole through the ground water or soil materials present in the ground water. In the case of fine grain soils, which are normally incapable of being drained, or, if drainable, only with great difficulty by usual methods, the phenomena of electro-osmosis is brought about in the capillaries of the soil. If the electrical current is flowing in the proper direction, the water particles are transported effectively through the pores of the soil in the direction of the lines of the electrical field to the well or catch basin near the cathode. As a result of this process, the increased movement of the underground water so brought about is far greater than that imposed by the natural hydraulic gradient.

In conceiving my present invention, I reasoned that the electro-osmosis effect as employed by the Germans for increasing the flow of underground water for drainage purposes might well be applied to the drainage of the high water table in alkali soils.

I further reasoned that by resorting to the German electro-drainage process, I might also reasonably expect to increase the effectiveness of the normal leaching process for removing sodium from the soil by increasing the drainage of the irrigation water through the soil to the underground water table. Bearing in mind the above principles and concepts, I therefore set about to install apparatus substantially as illustrated in Figure 1 of the accompanying drawings.

As seen in Figure 1, the soil area 10 to be treated is preferably bordered on one side by an open drainage ditch 11. A cathode 12 is placed along the bottom of such drainage ditch. An anode consisting of iron rods 13, or the like, are driven into the soil along a line generally parallel to the drainage ditch 11. The number of anode rods employed may be varied as desired, and may be spaced at intervals as desired. In any event, the anode rods 13 are interconnected by conductor 14 to a source of direct current electrical energy 15. The positive terminal 16 of the electrical energy source 15 is connected to the anode by electrical conductor 14 and its negative terminal 17 is connected to the cathode by a conductor 18.

While the cathode is shown as a wire or cable lying along the bottom of ditch 11, such may also comprise a series of interjoined electrically conductive rods or other forms of conductors. The electrical energy applied is direct current and may be presented by any known device capable of producing such potential.

Employing the features of the above outlined apparatus I set about to discover the effects of my improved process in the field. For my installations, I chose several areas of alkali bearing soil having a high water table. The results obtained are as follows:

PLOT 1

In this installation, a number 6AWG copper wire was placed in the bottom of the open drainage ditch 11 to serve as the cathode 12. On a line parallel to the cathode and approximately 500 ft. from the drainage ditch 12, a number of copper-plated iron rods were driven into the ground a depth of approximately 5 ft. and at 50 ft. intervals. A number of 6AWG copper wire conductor 14 was used to interconnect the several anode rods 13. A direct current welder unit was used as the source of direct current with its negative terminal connected to the cathode wire 12 and its positive terminal connected to the interconnected anode rods 13. The water table in this area was sufficiently high, that the soil was highly moist and additional flooding was thought unnecessary. Current was applied at a rate of 20–50 amperes and 75 volts. After the electric current had been applied for 1½ hours, it was observed that the amount of drain water in ditch 11 had increased approximately 180%. Effluent water from the side of the drain ditch 11 was at a remarkably higher level than before commencement of the operation and three observation wells located within the area treated showed that the water table had been lowered from 2 to 12 inches within approximately 2½ hours.

PLOT 2

For my second installation, I chose another location comprising a bogged area covered by white and black alkali. The area had not produced a crop for 19 years.

The distance between the anode and cathode was substantially 500 ft. with the spacing between the anode rods 13, substantially 50 ft. The rods 13 were driven into the ground as before, to a depth of approximately 6 ft. and direct current was applied at the rate of 21 amp. and 24 volts for 58 days. In this installation, excessive water was applied to the surface of the soil by flooding according to normal leaching procedure. The size of the plot was approximately 5 acres. In contrast to the installation used in Plot 1, I used a dry plate rectifier as the source of direct current energy 15. At the end of 50 days of treatment, the water table, which was initially very close to the surface, had depressed approximately 5 ft. The sodium content of the drain water in ditch 11 had increased over 20 times or from 1518 p. p. m. to 37,092 p. p. m. At the end of the test period, the sodium content of the soil had reduced enough to warrant placing this excluded land into pay class according to the United States Bureau of Reclamation Standards. Vegetation appeared during the period of treatment, and at the end of the 58 day treatment period a heavy growth of grass and sweet-clover were observed. Alfalfa subsequently grown within the treated area averaged about 8 inches higher than that in nearby untreated areas and matured approximately a week earlier.

PLOT 3

Following substantially the installation outlined in Plot 2, a third plot of approximately 11 acres was treated. The distance between cathode and anode in this plot was substantially 1200 ft. In this area, a salt crust had developed on the soil surface at the time the installation was made and the water table was very close to the upper surface. After treatment according to the principles of my improved process with the surface of the treated area kept wet by periodic irrigation, marked increase in vegetation was noted. Disappearance of all visible surface salts took place and a depression of the water table to a level of not less than 4½ ft. below the surface of the treated area was brought about.

PLOT 4

Adopting substantially the installation employed in Plot 2, a fourth plot bearing a high alkali content and a high water table was treated. In this plot, three separate adjacent areas were treated with the distance between cathode and electrode being varied at a minimum of 100 ft. in the first sub-plot, 200 ft. in the second sub-plot and 300 ft. in the third sub-plot. Similar results to those previously obtained in the other plots were observed. After treatment of the areas, which were formerly very sparse with vegetation, the areas were covered with a thick growth of volunteer pasture grass and are presently employed for pasturing sheep.

Various other plots have been treated according to my process adopting the principle of electro-osmosis and the standard leaching by flooding operation. In the various installations made to date, I have discovered that direct current may be applied successfully in the range of 3 to 45 amps. and 15 to 75 volts. The normal alternating current source of supply, such as 110, 220 or 440 volts as available, has been used to power the converter for attaining direct current energy. As a general rule, it appears that the increased water shed is substantially directly proportional to the amount of current employed and that the spacing between anode and cathode may vary at least between the ranges of 100 to 1200 ft. Various conductor materials have been used for electrodes, such as steel pipe, cable, wire, metal plates and carbon. The effects of various conductors appears of little or no consequence on the efficiency of the overall operation with the possible exception as to deterioration of the anodes. In this connection, it is approximated that steel anodes may be expected to deteriorate at a rate of substantially 20 pounds per amp./year as compared to a combination carbon-graphite anode which apparently deteriorates substantially at the rate of 2 pounds per amp./year. Various experiments have been made in the depth of penetration for the anodes and cathodes and generally speaking, it may be stated that the anode depth must penetrate at least to the level of the moist soil while the cathode depth for practical usage may vary in depth from 5 to 12 ft.

With regard to the moisture content of the soil treated, it is essential that the soil be moist at all times so as to ball upon compression in the hand. Preferably, a field to be treated under my process is flooded as hereinabove specified so as to insure an over-abundance of moisture at all times. The presence of the excessive water serves to permit current paths, between anode and cathode, to travel substantially along the surface of the soil thereby effectively treating the upper levels of the area as well as the subterranean levels.

Of surprising consequence in the treatment of alkali soils according to the above outlined process, is the overabundance or excessive amount of sodium discharged in the drain water. This phenomena is thought to be brought about largely for two reasons. Initially, at the application of electric current through the treated field, it is observed that a release of hydrogen and other gases takes place which percolate upwardly from the subterranean depths of the soil, loosening the soil particles. This loosening effect apparently causes increased permeability so that the normal effectiveness of the conventional leaching or flooding step in the process is greatly increased to carry with the permeating water detached sodium particles. This increase in sodium removal is not sufficient, however, to account for the remarkable increase in sodium found in the effluent drainage water near the cathode. As a consequence, it is apparent that the application of electrical energy to a field of the nature above described also serves to detach a large number of sodium ions and carry the same with the subterranean waters being pumped from the soil by the electro-drainage effect. It is further believed that the increased detachment of the sodium ions permits recombination of the less detachable calcium ions with salts or nutrients within the soil thereby accounting for the increased vegetational effect and the early maturation as typified by Plot 2 hereinabove. This latter observation is further substantiated by certain installations wherein the removal of the sodium had not yet advanced sufficiently to remove hard crusts of salt appearing on the surface, but in which nevertheless a marked increase in vegetation was observed.

In order to substantiate the surmises, beliefs, conclusions and observations immediately above outlined, it was decided that basic scientific research was necessary to explain technically the characteristics of the electrical treatment of soil and the remarkable results brought about by the improved process of this invention. To this end, a laboratory research testing program was formed in which a model tank, filled with highly alkaline soil was treated by various procedures, including electrical treatment under carefully controlled conditions. Periodic sampling of the soil and effluent water was carried out in a systematic arrangement and tests were conducted on the samples so gained to determine the changes in characteristics resulting from electrical treatment under my present process. Results of such tests were then related to those taking place from treatments without electricity and specifically according to the normal leaching or flooding down method.

As a background for understanding the information to follow, a brief review of broad soil groups found in the United States may be worthwhile at this juncture. Briefly, there are four such broad soil groups in which climate has played a major role in determining their end characteristics. Such soils may be classified generally as follows:

(1) *Podsolic soils.*—Such soils are characteristic of the New England states and the Northeast. They are developed under cool and damp climatic conditions. They are generally acid with pH values as low at 3.5. Carbonates, which are soluble under acid conditions, and alkali have long been leached from the soil. The resulting soil is generally in need of calcium and fertilizers for good agriculture tillage but excess alkali is not an expected problem.

(2) *Lateritic soils.*—These soils are developed under tropical conditions of high temperature and high amounts of rainfall. The characteristics of the soils in the Southeastern states approach this group. Alkali and other salts have been thoroughly leached from the soil and greater concentrations of aluminum and iron have developed. The pH values are generally near neutral.

(3) *Chernozemic soils.*—These soils are common in the Midwestern and Western sections of the United States and are the result of semi-arid and sub-humid climates. Leaching generally has been very mild and carbonates and other salts are present. With high rates of evaporation, alkali can frequently accumulate at the surface.

(4) *Desertic soils.*—These soils are characteristic of the arid regions of the West and because of the dominance of evaporation over precipitation, moisture movements in the soil are generally upward. Downward leaching, therefore, has not affected the soil and carbonates and salts are present in the upper horizons. As a result, these soils react well to irrigation and contain high concentrations of desirable ingredients for agriculture, but excess accumulations of salts and alkali are a common occurrance. The pH value is generally on the alkaline side.

It is, therefore, the chernozemic and desertic soils in the irrigable regions of the West and Midwest which are most susceptible to alkali soil development. The fact that leaching has been mild or non-existent results in a variety of chemical ingredients remaining in the soil. The high pH (or alkalinity) of the soil causes the lowly soluble carbonates (particularly calcium carbonate) to have relatively little movement. When upward movement of moisture is prevalent, the highly soluble sodium salts can readily accumulate excessively at the surface, causing alkali. These characteristics are not present in the well leached podsolic and lateritic soils.

To understand the processes of adjusting soil characteristics, such as reclaiming alkali soil, one must look into the fundamental characteristics of the soil particles. The soil particles vary from granular particles, which are relatively inactive and inert to chemical and moisture enviroment, to fine clay particles, which are very complex in their structure and greatly affected by chemical and moisture environment.

The clay mineral has a very complex chemical structure which varies according to the type of clay mineral present and according to climatic and other conditions that have caused its development. In most clays, however, the broken bonds left at the outside of their chemical structure and the substitution of lower valent ions for higher valent ions within their chemical structure, have resulted in unbalanced charges which attract cations from the outside environment.

The capacity of the clay mineral to absorb these cations is called the exchange capacity and the absorbed cations are called exchangeable ions. Technically speaking, the purpose of the exchangeable ions is merely to balance the charges of the clay mineral, and the exchangeable ions can be any one of a number of chemical elements or a combination of several different kinds. However, in practice, the type of exchangeable ion in the clay is influenced by its predominance in the outside environment of the mineral and the replacing power of one type of ion over that of another. Also, the size of the clay mineral and the type of clay mineral greatly affects the exchange capacity and its ability to exchange cations.

In the interest of the present invention concerning alkali soils, the exchange capacity of alkali soil can be looked upon as being highly concentrated with exchangeable sodium (Na) resulting from the heavy concentration of Na which is free to form as exchangeable ions because of the high solubility of Na salts. There may be, and generally is, in desertic and chernozemic soils, appreciable quantities of desirable calcium (Ca) in the form of carbonate. The Ca of these carbonates is not readily available to complete with sodium for the exchange positions because of their low solubility in alkaline environment. When calcium is available, however, it is known generally to have greater replacing power than Na.

Form a land classification standpoint, soil is considered nonarable when it has the combined features of excessive concentrations of salts, a pH above 9.0 and more than 15 percent sodium in the exchange capacity.

To control the development of alkali soils it is common knowledge that adequate drainage and controlled leaching must exist to reduce excess salts and to prevent the accumulation of soluble salts on the surface. Common reclaiming practices first specify this drainage requirement. The next aim is to provide means for exchanging the exchangeable sodium ions with other more desirable ions, particularly calcium. This second aim is more difficult in theoretical principle. Several processes are in common practice, some of which are the following:

(1) To add calcium compounds, such as $CaCl_2$ or $CaSO_4$, to the soil to provide Ca ions for exchange reaction.

(2) To add acid-forming materials, such as sulfur, to bring about the acid environment needed to release the already present calcium carbonate to solution and permit the calcium to exchange with the sodium. When sulfur is added, bacteria action is known to develop sulfuric acid in the soil. If calcium carbonate is not present, however, the soil merely is converted to an acid soil and no favorable gain of exchangeable Ca is accomplished for plant growth.

(3) Straight sulfuric acid may be utilized in alkali soil reclamation, but it is costly and hazardous to handle.

(4) Highly saline soils which do not contain excessive percentages of exchangeable Na may be readily reclaimed by merely leaching out the soluble salts.

In studying electro-osmosis and electro-chemical techniques in the laboratory, several trends of interest were noticed in relation to the electro-reclamation of alkaline soils. Briefly, it was discovered that small size specimens would show an exchange reaction taking place indicating that chemicals could be added to the anode to influence certain desirable changes. It was further found that after treatment, the anode side of the small specimen, such as a glass jar 4 inches in diameter and 4–6 inches high full of earth or the like, became high acidic while the cathode side became alkaline with the effluent water flooded over the surface and drawn to the cathode side of the electrodes being strongly alkaline. Even in soils of relatively low sodium content, the effluent water under these studies showed an uncommonly high content of sodium, indicating a strong tendency for the electrical treatment under my present process to remove sodium. Further observations indicated that the pH of the soil was greatly reduced at the anode and that calcium in the coil, which was originally in the form of calcium carbonate, was a principal contributor to soil changes brought about by my process.

Based on such initial studies, a large scale model, representative of typical field conditions, but fully controlled and confined to definite boundaries was constructed of reasonable size and relatively larger than the initial specimens tested. To this end, a tank of plywood was constructed and given a heavy inside coating of plastic paint to make it non-conductive. The dimensions of the tank were 10 ft. long, 8 ft. wide and 6 ft. deep. A plurality of iron bars were used for both anode and cathode in the test installation, such being placed on opposite sides of the tank and spaced at close intervals (3 inches) so as to provide a strong electrical field lengthwise of the tank and thereby avoiding complex converging fields which might result from widely spaced electrodes. A drainage system was installed at the cathode end of the tank and a system for flooding the surface of the soil was provided near the anode. Direct current electrical power was supplied to the anode from a rectifier which permitted control of voltage and measurement of current; such rectifier having a capacity of 20 volts and 300 amps. Thermocouples were installed at various points across the tank to measure soil temperature and provision was made for measuring water inflow and outflow and for collecting effluent water samples.

A highly saline-alkali soil was obtained from the Deaver, Wyoming area at a location near where the earlier field trials of Plots 1 through 4 had been conducted. The soil was thoroughly mixed so that the soil constituents were evenly distributed at the beginning of the program. The mixed soil was then weighed carefully and placed in the model where it was compacted to a density representing typical field conditions.

The soil was carefully analyzed and as shown in charted Figure 2 of the drawings, such was classified as silty-clay texture ranging from silt loam to clay loam. Measurement of the liquid limit, plastic limit and plasticity index were observed and a chemical analysis of the initial soil particularly for potassium, sodium, magnesium and calcium and other ingredients indicated in Figure 4 was conducted. The conductivity and pH factors were also determined as well as density and permeability. The samples used to test the initial content of the soil were taken from four separate locations within the tank and at diversified points. The average initial characteristics of the soil was found to be substantially as indicated in Table I below:

Table I

| | |
|---|---|
| Exchange capacity ................ me./100 gm__ | 21.8 |
| Exchangeable Na ................ me./100 gm__ | 6.5 |
| Exchangeable K ................ me./100 gm__ | .7 |
| Exchangeable Ca+Mg (by subtraction) me./100 gm__ | 14.6 |
| Soluble Na ................ me./100 gm__ | 15.8 |
| Total Na ................ me./100 gm__ | 22.3 |
| Total soluble salts ................ me./100 gm__ | 20.6 |
| Percent exchangeable Na ................ percent__ | 29.9 |
| Percent soluble Na ................ do____ | 76.7 |
| Saturation percentage (i. e. the percent moisture of the saturated soil paste) ................ percent__ | 73.3 |
| pH of the soil paste ................ | 8.7 |
| Conductivity ($K \times 10^6$ of the saturation extract) ................ millimhos__ | 20.3 |

Throughout the analysis of the process, series of soil samples were taken periodically at substantially 2 ft. intervals uniformly throughout the tank with the location of taking the samples being shifted laterally about 9 inches to 1 ft. each time to prevent sampling the same location. At the beginning of the experiment, water was flooded onto the surface of the soil at a higher rate of input than outflow, as reflected in the charted Figure 3, to accommodate requirements for saturation. After about 15 days, inflow and outflow equalized and a surface settlement of about 4 inches reached equilibrium with the temperature of the soil leveling off at approximately 70° F. This step is indicated as Step II in the charted figures and comprises a pure leaching step in which no electricity was applied.

During the next period, or Step III, electricity at 22 volts was applied with continued leaching. A noticeable rise in soil temperature to nearly 84° F. took place and a very slight increase in the discharge flow occurred.

During Step IV, a period of continued electricity and leaching, similar temperature and flow were noticeable with a slight decrease in the latter. At the end of Step IV, the anode rods were found to have deteriorated badly and were replaced. The flooding system was also changed to provide for flooding only near the anode and in vertical sand columns beside the anode.

Continued treatment of electricity with the revised system of flooding, Step V, as shown in Figure 3 of the drawings, showed similar temperature and flow characteristics; the temperature rising again due to the fact that the tank had cooled in standing idle for a few days.

In Step VI, a repeat leaching period with full surface flooding and without electrical treatment to check, on the relative differences between electrical and non-electrical treatments, was conducted. Some difficulty was encountered at this stage due to drain piping which was corrected. As soon as the correction in the piping took place, a somewhat higher discharge flow occurred than had been observed previously. Also of interest and at this stage, is the drop in soil temperature to 70° F.

After each period of treatment, the soil was systematically sampled, as previously related, across the entire longitudinal section of the model. A complete chemical analysis, consisting of the same determinations listed for the initial soil in Table I, was made for each sample. However, for simplification of demonstrating the soil changes resulting from the treatment, two principal items, exchangeable Na and total Na in me./100 gms. were selected to show characteristic trends. These results are given in Figures 5 and 6 of the drawings. In observing the several soil samples, it was determined that the initial exchangeable sodium throughout the soil in the test model was equal to about 6 me./100 gm. with a total sodium content equal to about 21 me./100 gm.

By taking the results of the soil samples taken at each testing step, contour lines were charted on a cross-sectional view of the model between points of equal exchangeable sodium, such lines being termed iso-exchangeable sodium lines. Likewise lines of equal total sodium were plotted and called iso-total sodium lines.

At the completion of Step II in the test, or after one month of leaching as shown in the charted figures of the drawings, the iso-exchangeable sodium lines and iso-total sodium lines showed that the leaching had caused the sodium to move away from the anode and the cathode and accumulate in greater quantities substantially in the lower center of the model. Of particular interest, was the fact that the iso-total sodium lines had progressed further than the iso-exchangeable sodium lines. This increased movement of the iso-total sodium lines seemed logical, since the leaching action, which was conducted by flooding the top of the test tank, normally could be expected to have a principal effect on that portion of the total sodium content which is soluble sodium and a minor effect on the exchangeable sodium.

At the completion of Step III, or after one month of leaching plus electricity, it was quite apparent that electrical treatment had moved the iso-exchangeable sodium lines at a greater rate then the iso-total sodium lines; both the iso-total and iso-exchangeable lines flattening out considerably after the electrical treatment and progressing markedly toward the cathode side of the tank. Noticeable depression or downward movement of the total and exchangeable sodium lines was also observed.

After Step IV or at the completion of the second month of leaching plus electricity, the comparison of the iso-total and exchangeable sodium lines showed a marked movement of the sodium away from the anode side of the tank with an apparent buildup or block of sodium movement near the lower central portion of the tank. It was at this step that it was decided to revise the flooding process so that only the area near the anode would have access to flood water and greater dependence on the forces of electrical treatment would be required. At this time, the filter sand in the drains was also flushed somewhat to clear the drain outlets and the anode rods were replaced with new rods.

After Step V, or at the completion of the third month of leaching plus electricity, the change in the flooding method to that of adding water only at the anode was noticeably apparent by comparing the iso-lines. During Step V, an appreciable change in the soil conditions took place with striking movement of the bottom concentrations of sodium toward the cathode side of the tank. The highest values of total sodium were at 15 me./100 gm. and exchangeable sodium at 6 me./100 gm. Such iso-lines of the high total sodium and exchangeable sodium were located high in the tank and near the cathode side.

Following Step V and the continued application of electricity for three months, it was decided to again observe the effects of leaching only to check the previous interpretations of results. This leaching period is represented as Step VI in the charted figures of the drawings and such demonstrated a rather interesting development in the movement of the sodium within the tank. It was observed that a higher concentration of sodium had developed or sodium had apparently backed up within the tank even though leaching continued in the direction from the flood toward the drain. The logical explanation for this occurrence is that the cathode end of the model was undoubtedly heavily concentrated with sodium which was available to back up in the soil pore water by solution process. It therefore seems apparent that the electricity in the preceding periods of treatment had potential or force action to push the sodium in the direction of the cathode.

During all periods of treatment, as noted hereinbefore, samples of effluent water were obtained weekly and complete chemical analyses were made thereof. During the first period of leaching (Step II), the water samples were clear with no noticeable precipitation. During the next periods of leaching plus electrical treatment (Steps III, IV, and V), appreciable amounts of precipitation showed in the effluent water. Figure 4 graphically represents the occurrence of such precipitates. Regarding Figure 4, it will be noted that at the beginning of the electrical treatment a consistent increase in precipitate was observed. The precipitate was of an appreciable amount throughout Step V. During the repeat period of leaching only (Step VI), it is of interest to note that the precipitate again disappeared, checking the condition which occurred during the first leaching only phase (Step II). This development of precipitate during the electrical treatment was somewhat of a problem in the study requiring frequent care in maintaining the drainage system clean. It is believed, however, that this characteristic is evidence of an important effect of electrical treatment as will be explained presently.

The data of Figure 4 appears extremely important in providing theoretical interpretation of the effect shown by electro-reclamation under my present process. The various periods of treatment are indicated by the brackets near the bottom of that figure. Some irregularities are evident in the plots as should be expected in sampling such a large test experiment. Although close control was maintained, many incidents occurred, such as the clogging of drains, the removal of flood water to obtain soil samples, the correction of piping conditions and others which can account for the fluctuation of data values. However, general viewing of the graph in Figure 4 brings out definite trends and characteristics of the electro-reclamation treatment.

During the initial leaching only phase (Step II) the major content of the effluent water was sodium and $SO_4$. It is of particular interest to note that the appearance of calcium and magnesium and only negligible amounts of carbonate ($CO_3$) were observed.

During the steps of leaching plus electricity (Steps III, IV, and V) sodium and sulfate, the principal materials, increased and therefore total dissolved solids also showed an increase. The calcium in solution also dropped to negligible values and magnesium dropped appreciably. The carbonate in solution showed a marked increase. The shaded areas of the graph in Figure 4 indicate quantities present as precipitate and these were mainly calcium, magnesium and carbonate.

The above facts are definite evidences of the effects of electrical action and support the theory that electricity influences an exchange reaction of calcium for sodium which was brought out earlier by the iso-exchangeable sodium and the iso-total sodium line observations made from the soil test samples. The fact that soluble calcium drops to negligible amounts from the effluent water indicates that it is being used for cation exchange in the soil. Calcium and magnesium carbonates apparently are abundant in the soil, but are relatively insoluble therefore, such did not move into the effluent water during the leaching only period. However, when electricity was applied these materials apparently became soluble and overflowed into the effluent water and returned to precipitate in the alkaline environment of the effluent water. Such observations would lend support to the theory that much calcium and magnesium were made available for cation exchange from the carbonates in the soil during the electrical treatment and were not made available during leaching only without electricity.

In order to recheck the above observations concerning the electrical treatment, a further repeat period of leaching only without electricity (Step VI) was carried out.

The analysis of effluent water samples showed a definite return of characteristics to those shown by the first leaching only period (Step II). The precipitate disappeared, calcium and magnesium in solution reoccurred, sodium and $SO_4$ decreased and total dissolved solids decreased.

Further contrasting characteristics shown by electrical treatment, as shown from Figure 4, is evident from the effluent water pH values. During leaching only (Step II) the pH remained at about 8, or slightly lower than that of the soil. During electrical treatment, the pH value increased to high alkalinity of 11 and 12, and again reduced to 8 during the repeat period of leaching only (Step VI). Such characteristics have occurred in past work in electro-osmosis and electro-chemical studies and are evidence of the electro-phoresis activity of the pore water. Hydroxides (OH) are apparently carried into the effluent water, as also shown in graph Figure 4, and hydrogen is released in the soil to influence acidic development in the soil. These factors amply support the conclusion that carbonates are made soluble by electrical treatment and in turn calcium is made available for cation exchange.

Undoubtedly, pH characteristics of the soil and the changes in pH values significantly influence cation exchange reactions. In taking the various soil samples from the test model, Steps I through VI, initial pH value for the soil was determined at approximately 8.5 to 8.8. During Step II, leaching only, the pH value dropped slightly and was generally uniform in value at about 8 to 8.4 across the model. During Steps III, IV and V, the periods of leaching plus electricity, the pH dropped near the anode and tended to remain about the same or increase slightly near the cathode. Significant changes were not apparent during the repeat leaching period (Step VI).

From the above discussed laboratory examination of the present electro-reclamation process, it is felt that the laboratory test model adequately defines the basic characteristic reactions resulting from electrical treatment of alkali soils under my process. The data of systematic series of tests throughout the treatment periods provide records showing trends of changes in characteristics between electrical treatment and treatment without electricity according to the known or normal leaching process. It must be understood, of course, that the process of electrical treatment herein set forth is not to be expected to result in sudden adjustments in soil conditions in the field. It requires time for reactions to progress in the same sense that the old method of leaching and addition of soil amendments require time. It is submitted, however, that electrical treatment, as indicated by the field application initially discussed, is an added force which will produce results faster than that obtainable from natural trends of soil adjustment.

In general, it appears that the reactions resulting from electrical treatment are in the direction of established theories of alkali soil reclamation which have been accepted for many years. Increased amounts of sodium occur in the effluent water and the reductions of soluble calcium in the effluent water indicates that it is probably being used for cation exchange of sodium. Analyses of the soil samples in the test model showed greater progress of reducing exchangeable sodium when electricity is applied. A trend toward acid development in soil given electrical treatment is evident, which would normally cause non-available calcium in the form of carbonates to become available for exchange reaction. This latter is one of the principal aims in employing the old leaching process and using soil amendments. Furthermore, it is evident that movement of carbonates takes place as witnessed by their overflow into effluent water and their showing as precipitate. Of greatest importance from a practical standpoint, is that these favorable characteristics take place under the influence of electricity and controlled leaching where the soils already contain sufficient calcium. That is, amendments are not required to encourage reactions as they are in the old leaching method. Reliance on this preceding favorable characteristic is dependent on the understanding that most of the chernozemic and desertic soils of the arid and semi-arid regions of the West generally contain sufficient ingredients to properly reclaim the soil. In cases where calcium is lacking, calcium compounds, of course, must be added.

It should further be recognized that the resultant test figures illustrated in the accompanied charted showing of the test data are rather on the conservative side since the same are taken as an average change for the whole model. This observation is especially pertinent as regards the change in sodium, since in using the whole model to gain average data figures, a fair picture of actual changes resulting from the various periods of treatment would not necessarily be indicated. This will be appreciated since certain portions of the model are relatively cleaned by treatment while in other portions salts have accumulated. For example, if the summations were made for samples near the anode, there would be greater evidences of sodium removal than for summations for sample from the whole model. Therefore, it is believed that these summary charts and graphical showings of the average changes for the whole model are conservative viewpoints.

Figure 5:
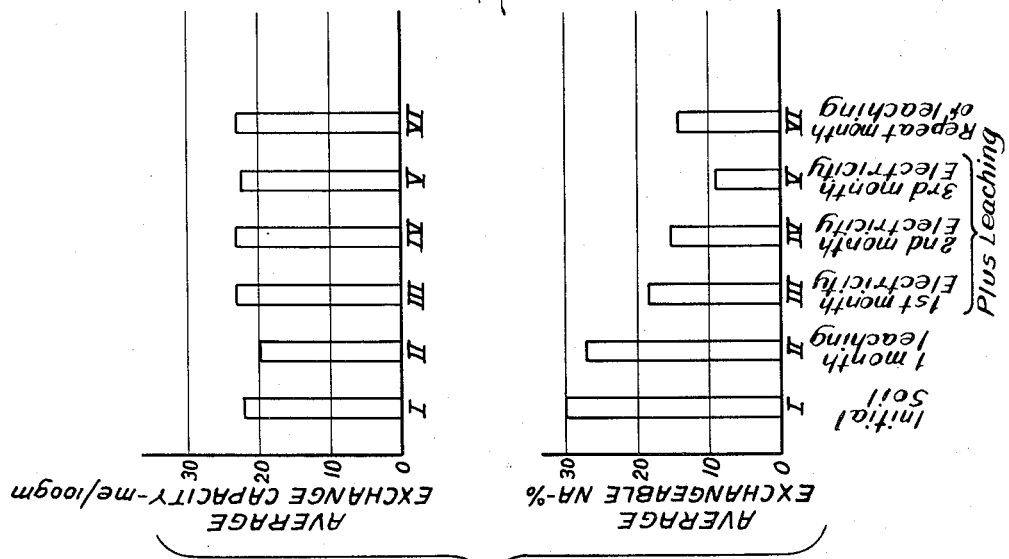

In Figure 5, the average exchangeable sodium in percent with respect to the exchange capacity for each of Steps I through VI is set forth. Although a slight reduction of exchangeable sodium percent occurred during Step II leaching only, there is evidence of appreciably greater reduction during electrical treatment periods, Steps III, IV and V. When the leaching only period was repeated (Step VI) a return of sodium occurred as supported by earlier data.

Figure 6:
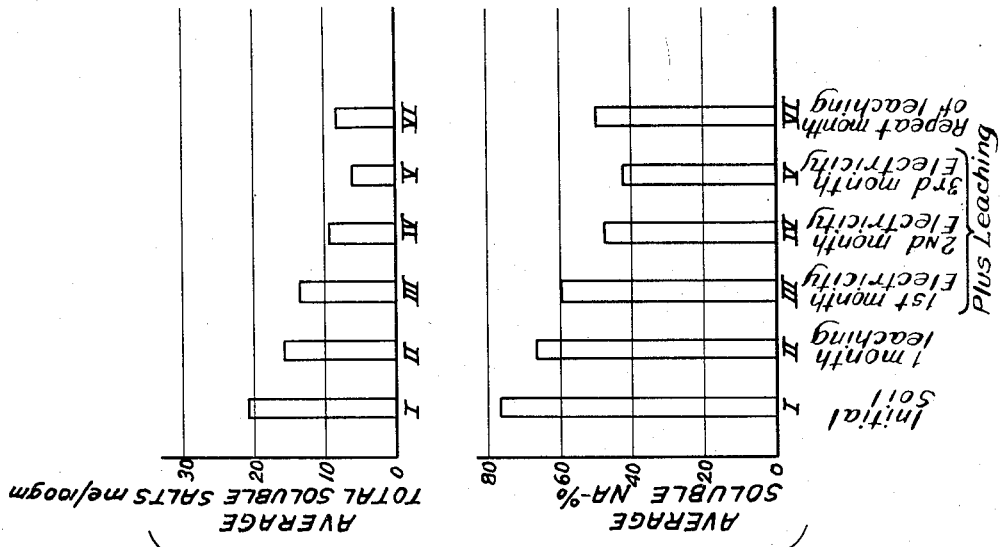
Figures 5 and 6 are charts summarizing the average change in sodium which occurred in the laboratory operation of my process.

Figure 6 shows the available sodium in percent with respect to total soluble salts for each of Steps I through VI. There is no apparent evidence of contrasting differences in this comparison between the leaching only periods and the electrical treatment periods. The apparent trends appear to be a gradual reduction throughout all periods. Since leaching was continuous during all periods of treatment, it appears that reductions in soluble salts are primarily influenced by the leaching action. Although not clearly evident, it is possible that electricity may have given an additional boost to the leaching action of the salts. This statement appears substantiated by the return of salts and sodium during Step VI, the repeat period of leaching only.

In summation of the test results, it is evident that electricity by and of itself cannot be expected to reclaim alkali soil, but that controlled leaching must also accompany the electrical phenomena as a means for carrying away or removing the excess objectionable materials. The effect of the electricity is to be regarded as setting up favorable conditions for desirable reactions to take place and as a means for assisting the occurrence of such reaction.

From the foregoing description and discussions, it is believed that those familar in the art will readily recognize and appreciate the marked advancement that my present process makes over prior known means of reclaiming alkali soils. It is further believed that the field and laboratory examination of this process adequately describes the metes and bounds thereof. However, it should be remembered that while I have herein disclosed and described my process in conjunction with certain specified ranges and materials, the principles and spirit of the invention are not necessarily to be restricted to the particulars set forth in the accompanying specification and drawings, but are subject to numerous changes, modifications and substitutions of equivalents without departing from the scope of my present invention. As a consequence, it is not my intention to be limited to the particular illustrations and embodiments of the process as herein described and set forth except as may appear in the following appended claims.

I claim:
1. A process for stimulating plant growth and increasing crop yield in soils of agricultural quality, comprising the steps of, irrigating the soil with sufficient quantities of water to satisfy the normal demands of the crop planted therein, and cotemporaneously subjecting the root zone of said crop to electro-osmosis, electrophoresis, and electro-chemical reaction to substantially reduce the content of vegetation harmful sodium salts without materially lessening the calcium content therein by applying a direct current electrical potential between anodes and cathodes thrust into the soil adjacent the opposite borders of an area thereof to be treated, the depth of penetration of said anodes and cathodes being sufficient to cause penetration of said electrical potential at least to the depths of said root zone.

2. A process for reclaiming and improving, to crop productive quality, soils of a type suitable for agricultural use, but excessively alkaline or saline in character, comprising the steps of, flooding a large area of soil to be treated with water in quantities sufficient to maintain the soil moist throughout the process, and applying direct current electrical energy between widely spaced anodes and cathodes thrust into the moist upper strata of such soil and located along opposite sides of said area to thereby substantially reduce the sodium content of such upper strata without materially lessening the calcium content therein.

3. A method for reclaiming agricultural class alkaline and saline soils to agricultural quality, comprising the steps of, supplying an area to be treated with sufficient quantities of water to wet the soil throughout the reclamation process, and applying direct current electrical potential between widely spaced anodes and cathodes thrust into the upper strata of such soil to activate and facilitate migration of vegetation harmful sodium ions downwardly from the surface of said soil, the supply of water and the application of such electrical potential being maintained for a time sufficient to substantially reduce the exchangeable sodium content of the soil at normal root zone depths without materially lessening the beneficial calcium content thereof.

4. A method for accelerating leaching of alkaline soils for the removal of undesirable alkaline salts and alkali metal ions, particularly from the upper strata thereof, comprising the steps of, ponding an area to be treated with water in sufficient quantities to maintain the upper strata thereof moist throughout the process, and subjecting such moist upper strata to electro-chemical reaction by applying direct current electrical potential between widely spaced anodes and cathodes disposed along opposite lateral limits of said strata thereby to substantially reduce the sodium content therein by removing exchangeable sodium ions and exchanging the same with calcium ions present in the soil.

References Cited in the file of this patent
UNITED STATES PATENTS

| | | |
|---|---|---|
| 822,175 | Wolcott | May 29, 1906 |
| 1,372,743 | Gardner | Mar. 29, 1921 |

FOREIGN PATENTS

| | | |
|---|---|---|
| 432,253 | Great Britain | July 23, 1935 |
| 512,762 | Great Britain | 1939 |

OTHER REFERENCES

Journal of Agricultural Science (1931), vol. 31, pp. 484–492, article by Basu.